United States Patent
Agata et al.

(10) Patent No.: US 9,550,915 B2
(45) Date of Patent: Jan. 24, 2017

(54) THERMOSETTING POWDER COATING MATERIAL

(71) Applicant: FUJI XEROX CO., LTD., Tokyo (JP)

(72) Inventors: Takeshi Agata, Kanagawa (JP); Susumu Yoshino, Kanagawa (JP); Takahiro Ishizuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 170 days.

(21) Appl. No.: 14/608,890

(22) Filed: Jan. 29, 2015

(65) Prior Publication Data

US 2016/0024347 A1  Jan. 28, 2016

(30) Foreign Application Priority Data

Jul. 28, 2014 (JP) .................. 2014-153332

(51) Int. Cl.
*C09D 183/04* (2006.01)
(52) U.S. Cl.
CPC .................. *C09D 183/04* (2013.01)
(58) Field of Classification Search
CPC .................. C09D 183/04; Y10T 428/2892
USPC ...................................... 428/403
See application file for complete search history.

(56) References Cited

U.S. PATENT DOCUMENTS

| | | | | |
|---|---|---|---|---|
| 6,861,475 B2 * | 3/2005 | Ilenda | .................. | C09D 5/037 525/65 |
| 2004/0077784 A1 * | 4/2004 | Ilenda | .................. | C09D 5/037 525/64 |
| 2015/0353762 A1 * | 12/2015 | Matsumura | .......... | C09D 167/00 428/336 |
| 2015/0368477 A1 * | 12/2015 | Yoshino | ................. | C09D 5/031 428/335 |

FOREIGN PATENT DOCUMENTS

| JP | 2004-162021 | * | 6/2004 |
|---|---|---|---|
| JP | 2004-162021 A | | 6/2004 |
| JP | 2009-057487 | * | 3/2009 |
| JP | 2009-057487 A | | 3/2009 |
| JP | 2010-090355 | * | 4/2010 |
| JP | 2010-090355 A | | 4/2010 |

\* cited by examiner

*Primary Examiner* — Leszek Kilman
(74) *Attorney, Agent, or Firm* — Oliff PLC

(57) ABSTRACT

A thermosetting powder coating material contains powder particles having a core that has a sea-island structure composed of an island portion containing a surface adjusting agent and a sea portion containing a thermosetting resin and a thermosetting agent, and a resin coating portion that coats a surface of the core.

20 Claims, No Drawings

THERMOSETTING POWDER COATING MATERIAL

CROSS-REFERENCE TO RELATED APPLICATIONS

This application is based on and claims priority under 35 USC 119 from Japanese Patent Application No. 2014-153332 filed Jul. 28, 2014.

BACKGROUND

1. Technical Field

The present invention relates to a thermosetting powder coating material.

2. Related Art

In recent years, since a small amount of volatile organic compounds (VOC) is discharged in a coating step and a powder coating material which is not attached to a material to be coated can be collected and reused after the coating, a powder coating technology using a powder coating material is given attention from the viewpoint of a global environment. Accordingly, various powder coating materials are being investigated.

SUMMARY

According to an aspect of the invention, there is provided a thermosetting powder coating material including:

powder particles having a core that has a sea-island structure composed of an island portion containing a surface adjusting agent and a sea portion containing a thermosetting resin and a thermosetting agent, and a resin coating portion that coats a surface of the core.

DETAILED DESCRIPTION

Hereinafter, exemplary embodiments as examples of the invention will be described in detail.

Thermosetting Powder Coating Material

A thermosetting powder coating material according to the exemplary embodiment (hereinafter, also referred to as a "powder coating material") includes powder particles having a core including the sea-island structure composed of the island portion containing the surface adjusting agent and the sea portion containing a thermosetting resin and a thermosetting agent, and a resin coating portion for coating a surface of the core.

The powder coating material according to the exemplary embodiment may be any of a transparent powder coating material (clear coating material) not containing a colorant in the powder particles, and a colored powder coating material containing a colorant in the powder particles.

The powder coating material according to the exemplary embodiment may form a coating film which is excellent in smoothness according to the above-described configuration.

The reason for this is not clear, but is considered to be as follows.

In the coating performed by the powder coating material, it has been required to form a coating film which is excellent in smoothness.

In order to form the above coating film, there is a method of containing a surface adjusting agent to the powder particles configuring the powder coating material.

However, when the powder particles are prepared by a kneading and pulverizing method, it is necessary to use the surface adjusting agent which is solid and does not slide in a device at the time of kneading, therefore, it is difficult to control a shape of the surface adjusting agent in the powder particles. In addition, after preparing the powder particles, even in a case where the surface adjusting agent is added later, it is difficult to control the shape of the surface adjusting agent in the powder particles.

According to the shape of the surface adjusting agent in the powder particles, a phenomenon in which the surface adjusting agent is deposited on the surface of powder particles (hereinafter, referred to as "bleed". In addition, a phenomenon in which inclusions (a thermosetting agent, a colorant added if necessary, in addition to the thermosetting agent, or other additives) in the powder particles are deposited on the surface of powder particles is also referred to as "bleed".) is likely to occur. In addition, the smoothness is affected by the shape of the surface adjusting agent in the powder particles when forming the coating film; therefore, it is difficult to prepare the coating film which is excellent in smoothness.

Here, it is desired that the function of the surface adjusting agent is further improved in order to obtain the coating film which is excellent in smoothness.

In the powder coating material according to the exemplary embodiment, the powder particles are used, which include the core including the sea-island structure composed of the island portion containing the surface adjusting agent and the sea portion containing the thermosetting resin and the thermosetting agent, and the resin coating portion which coats the surface of the core.

That is, the powder particles have a structure in which the surface adjusting agent is present in the core as the island portion of the sea-island structure, and then the surface of the core is coated with the resin coating portion. With this structure, even when the powder coating material is stored, the form of the island portion hardly changes due to the surface adjusting agent. In addition, the surface adjusting agent is present in the island portion of the sea-island structure, thus at the time of forming the coating film, that is, at the time of coating and baking, the surface adjusting agent spreads over the surface of a material to be coated, and surface tension of the coating material which is melted is extremely reduced, thereby obtaining the coating film which is excellent in smoothness.

From the above description, the powder coating material according to the exemplary embodiment is presumed to form the coating film which is excellent in smoothness.

Since the powder coating material according to the exemplary embodiment forms the coating film having excellent smoothness, glossiness of the obtained coating film is also increased.

In addition, since it is possible to prevent the bleed of the inclusions in the core and thus portion the powder coating material according to the exemplary embodiment has excellent storage properties, the coating film having excellent smoothness is formed in the same manner as described above, even when the powder coating material not attached to the surface to be coated is reused after the coating. Accordingly, the powder coating material according to the exemplary embodiment also has high durability.

Further, since the powder coating material according to the exemplary embodiment has high storage property, high transportation efficiency, high coating efficiency and excellent coating workability are obtained.

Hereinafter, the powder coating material according to the exemplary embodiment will be described in detail.

The powder coating material according to the exemplary embodiment includes the powder particles.

The powder coating material may include an external additive which is attached to the surface of the powder particle, if necessary, in order to improve fluidity.

Powder Particles

The powder particle has a core and a resin coating portion attached to the surface of the core. That is, the powder particle is a particle having a so-called core/shell structure.

Core

The core is configured to contain the surface adjusting agent, the thermosetting resin, and the thermosetting agent. The core may contain other additives such as the colorant if necessary.

First, components configuring the core will be described.

Surface Adjusting Agent

Any known surface adjusting agent which is used for the powder coating material may be exemplified as the surface adjusting agent.

Specific examples of the surface adjusting agent include the polysiloxane compound, the wax, acrylic oligomer, or the like.

Particularly, in terms of the improvement of the smoothness in the coating film and surface-tension reducibility by using the surface adjusting agent, it is preferable that the surface adjusting agent is one kind selected from the group consisting of a polysiloxane compound and wax.

Further, in terms of the improvement of the smoothness in the coating film and wettability to a material to be coated by using the surface adjusting agent, it is preferable that the surface adjusting agent is liquid at room temperature (25° C.)

Polysiloxane Compound

In the exemplary embodiment, the polysiloxane compound means a compound having plural siloxane bonds, and silicone oil, modified silicone oil, or the like is exemplified.

Among these, a silicone oil is preferable in terms of the surface-tension reducibility and the compatibility with the thermosetting resin which is the main resin.

Straight silicone oil or modified silicone oil may be used as the silicone oil, but non-reactive silicone oil, which does not react to the resin component such as the thermosetting resin coexisting in the powder particles, is preferable in terms of the formability of the island portion.

Specifically, examples of the silicone oil include dimethyl silicone oil, silicone oil containing an amino group, silicone oil containing an epoxy group, silicone oil containing an ether group, silicone oil containing a methacrylic group, silicone oil containing a mercapto group, silicone oil containing a phenyl group, silicone oil containing a long chain alkyl group, silicone oil containing a hydrogen group, or the like. Among these, the silicone oil containing a long chain alkyl group is preferable in terms of the improvement of the smoothness of the coating film.

The silicone oil may be used alone or in combination of two or more kinds thereof.

Waxes

Examples of waxes include hydrocarbon wax, natural wax such as carnauba wax, rice wax, and candelilla wax, synthetic wax or mineral and petroleum wax such as montan wax and ester wax such as fatty acid ester and montanic acid ester, or the like.

Among these, hydrocarbon wax is preferable in terms of compatibility with the thermosetting resin.

SP Value of Surface Adjusting Agent

The surface adjusting agent is, as described above, in a state of forming the island portion in the sea portion containing the thermosetting resin in the core.

In order to easily form the sea-island structure, it is preferable to select, with respect to the surface adjusting agent, a combination in which a phase separation is likely to occur between the thermosetting resin and the surface adjusting agent.

For example, with respect to an SP value of the thermosetting resin, an SP value of the surface adjusting agent is preferably separated by equal to or greater than 3.0, and is further preferably different from each other in the range from 2.0 to 2.5.

For example, if the thermosetting resin forming the sea portion of the core potion is a thermosetting polyester resin, and the SP value is 10.0, it is preferable to use the surface adjusting agent having the SP value in the range from 7.0 to 13.0.

Here, the SP value means a value obtained by a Fedor estimation method.

This method is performed by calculating an SP value of a high polymer by a segment unit based on a value of a cohesive energy which is defined for each substituent in accordance with the hypothesis that cohesive energy density relies on kinds and the number of the substituent. In addition, a value obtained by dividing the cohesive energy calculated according to this method by molar volume of substance and then extracting the square root is assumed to be an SP value (Reference: SP values, Basis, Application and Calculation Method, by YAMAMOTO Hideki; 2005, JOHOKIKO CO. LTD.).

The customary unit of the SP value obtained by this method is $cal^{1/2}/cm^{3/2}$, and is written in a dimensionless manner. Additionally, in the specification, the relative difference of the SP values between two compounds is significant, and thus the SP value is written in a dimensionless manner by using the value obtained in accordance with the above described custom. Meanwhile, for reference, the SP value obtained by this method may be multiplied by 2046 when being converted into an SI unit $J^{1/2}/m3/2$).

In the exemplary embodiment, the diameter of the island portion formed by the surface adjusting agent is preferably from 0.001 μm to 0.5 and more preferably from 0.01 μm to 0.1 μm in terms of easily realizing a function of the surface adjusting agent, realizing the smoothness at the time of melting the coating material, and the compatibility.

Here, the diameter of the island portion means an average value of the major axis diameter of the island portion formed by the surface adjusting agent.

A measuring method of the diameter of the island portion is as follows.

The measurement of the diameter of the island portion in the powder particles is performed by image-analyzing images of the cross section of the powder particles by using a scanning transmission electron microscope (STEM).

Specifically, the powder particles to be measured are embedded in the epoxy resin first, and then the epoxy resin is solidified. The solid is sliced to the thickness of 100 nm by using a microtome. The ruthenium staining is performed on the cross section of the powder particles of the slice by using the aqueous solution containing 0.5% of a ruthenium tetroxide, and then STEM images of a cross section of the powder particles is obtained by using the scanning transmission electron microscope (STEM). Among the STEM images, a light-colored portion is the island portion (the domain) of the surface adjusting agent. The major axis diameter of the island portion of the surface adjusting agent is measured by image-analyzing the obtained STEM image. Specifically, the major axis diameter of the island portion of the surface adjusting agent is measured by electronizing the images observed by the scanning transmission electron microscope (STEM), and capturing the images by using image analysis software which is manufactured by MITANI CORPORATION (Wim ROOF), for example, in the procedure as follows.

After selecting an area of the cross section of the powder particles as a target, a binarization treatment is performed by using an "automatic binarization—discriminant analysis method" of a "binarization treatment" command, and then the major axis diameter of the island portion of the surface adjusting agent is measured by analyzing the "absolute maximum length" of measuring items with respect to one by one of the island portion of the extracted surface adjusting agent.

In a case where the automatic binarization is not normally performed due to the density and noise at the time of imaging photographs, the image is made clear by performing a "filter median" treatment and an edge extraction treatment, or after manually setting a base position, the major axis diameter of the island portion of the surface adjusting agent may be measured while confirming the image in a manual binarization command.

In addition, the value of the major axis diameter of the island portion of the surface adjusting agent employs an average value of a hundred of the powder particles.

The content of the surface adjusting agent in the core is preferably from 0.01% by weight to 10.0% by weight and more preferably from 0.1% by weight to 5.0% by weight with respect to the entirety of the powder particles, in terms of easily realizing a function of the surface adjusting agent, phase separation at the time of melting the coating material, and the leveling.

Thermosetting Resin

The thermosetting resin is a resin having a thermosetting reactive group. Examples of the thermosetting resin include various kinds of resins which are used for the powder particles of the powder coating material in the related art.

The thermosetting resin is preferably a water-insoluble (hydrophobic) resin. When a water-insoluble (hydrophobic) resin is used as the thermosetting resin, environmental dependence of charging characteristics of the powder particles (the powder particles) is reduced. In addition, in a case where the powder particles are manufactured by an aggregation and coalescence method, also from the viewpoint of obtaining emulsification dispersion in an aqueous medium, a water-insoluble (hydrophobic) resin is preferably used as the thermosetting resin. Moreover, water-insolubility (hydrophobicity) means that the dissolution amount of an object substance with respect to 100 parts by weight of water at 25° C. is less than 5 parts by weight.

Among the thermosetting resins, at least one kind selected from the group consisting of a thermosetting (meth)acrylic resin and a thermosetting polyester resin is preferable.

Thermosetting (Meth)Acrylic Resin

The thermosetting (meth)acrylic resin is a (meth)acrylic resin including a thermosetting reactive group. For the introduction of the thermosetting reactive group to the thermosetting (meth)acrylic resin, a vinyl monomer including a thermosetting reactive group may be used. The vinyl monomer including a thermosetting reactive group may be a (meth)acrylic monomer (a monomer containing a (meth) acryloyl group), or may be a vinyl monomer other than the (meth)acrylic monomer.

Examples of the thermosetting reactive group of the thermosetting (meth)acrylic resin include an epoxy group, a carboxyl group, a hydroxyl group, an amide group, an amino group, an acid anhydride group, a (block) isocyanate group, and the like. Among these, as the thermosetting reactive group of the (meth)acrylic resin, at least one kind selected from the group consisting of an epoxy group, a carboxyl group, and a hydroxyl group is preferable, from the viewpoint of ease of preparation of the (meth)acrylic resin. Particularly, from the viewpoints of excellent storage stability of the powder coating material and coating film appearance, at least one kind of the thermosetting reactive group is more preferably an epoxy group.

Examples of the vinyl monomer including an epoxy group as the thermosetting reactive group include various chain epoxy group-containing monomers (for example, glycidyl (meth)acrylate, β-methyl glycidyl (meth)acrylate, glycidyl vinyl ether, and allyl glycidyl ether), various (2-oxo-1,3-oxolane) group-containing vinyl monomers (for example, (2-oxo-1,3-oxolane) methyl (meth)acrylate), various alicyclic epoxy group-containing vinyl monomers (for example, 3,4-epoxycyclohexyl (meth)acrylate, 3,4-epoxycyclohexylmethyl (meth)acrylate, and 3,4-epoxycyclohexylethyl (meth)acrylate), and the like.

Examples of the vinyl monomer including a carboxyl group as the thermosetting reactive group include various carboxyl group-containing monomers (for example, (meth) acrylic acid, crotonic acid, itaconic acid, maleic acid, and fumaric acid), various monoesters of α,β-unsaturated dicarboxylic acid and monohydric alcohol having 1 to 18 carbon atoms (for example, monomethyl fumarate, monoethyl fumarate, monobutyl fumarate, monoisobutyl fumarate, mono-tert-butyl fumarate, monohexyl fumarate, monooctyl fumarate, mono-2-ethylhexyl fumarate, monomethyl maleate, monoethyl maleate, monobutyl maleate, monoisobutyl maleate, mono-tert-butyl maleate, monohexyl maleate, monooctyl maleate, and mono-2-ethylhexyl maleate), monoalkyl ester itaconate (for example, monomethyl itaconate, monoethyl itaconate, monobutyl itaconate, monoisobutyl itaconate, monohexyl itaconate, monooctyl itaconate, and mono-2-ethylhexyl itaconate), and the like.

Examples of the vinyl monomer including a hydroxyl group as the thermosetting reactive group include various hydroxyl group-containing (meth)acrylates (for example, 2-hydroxyethyl (meth)acrylate, 2-hydroxypropyl (meth) acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and polypropylene glycol mono(meth)acrylate), an addition reaction product of the various hydroxyl group-containing (meth)acrylates and ε-caprolactone, various hydroxyl group-containing vinyl ethers (for example, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), an addition reaction product of the above-described various hydroxyl group-containing vinyl ethers and ε-caprolactone, various hydroxyl group-containing allyl ethers (for example, 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether, and 6-hydroxyhexyl (meth)allyl ether), an addition reaction product of the above-described various hydroxyl group-containing allyl ethers and ε-caprolactone, and the like.

In the thermosetting (meth)acrylic resin, other vinyl monomers not including a thermosetting reactive group may be copolymerized, in addition to the (meth)acrylic monomer.

Examples of the other vinyl monomer include various α-olefins (for example, ethylene, propylene, and butene-1), various halogenated olefins except fluoroolefin (for example, vinyl chloride and vinylidene chloride), various aromatic vinyl monomers (for example, styrene, α-methyl styrene, and vinyl toluene), various diesters of unsaturated dicarboxylic acid and monohydric alcohol having 1 to 18 carbon atoms (for example, dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate), various acid anhydride group-containing monomers (for example, maleic anhydride, itaconic anhydride, citraconic anhydride, (meth)acrylic anhydride, and tetrahydrophthalic anhydride), various phosphoric acid ester group-containing monomers (for example, diethyl-2-(meth)acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate), various hydrolyzable silyl group-containing monomers (for example, γ-(meth)acryloyloxypropyl trimethoxysilane, γ-(meth)acryloyloxypropyl triethoxysilane, and γ-(meth)acryloyloxypropyl methyldimethoxysilane), various aliphatic vinyl carboxylate (for example, vinyl acetate, vinyl propionate, vinyl butyrate, vinyl isobutylate, vinyl caproate, vinyl caprylate, vinyl caprate, vinyl laurate, branched aliphatic vinyl carboxylate having 9 to 11 carbon atoms, and vinyl stearate), various vinyl esters of carboxylic acid having a cyclic structure (for example, vinyl cyclohexane carboxylate, vinyl methylcyclohexane carboxylate, vinyl benzoate, and vinyl p-tert-butyl benzoate), and the like.

In the thermosetting (meth)acrylic resin, in the case of using a vinyl monomer other than the (meth)acrylic monomer, as the vinyl monomer including a thermosetting reactive group, an acrylic monomer not including a thermosetting reactive group is used.

Examples of the acrylic monomer not including a thermosetting reactive group include alkyl ester (meth)acrylate (for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth)acrylate, isodecyl (meth)acrylate, lauryl (meth)acrylate, and stearyl (meth)acrylate), various aryl ester (meth)acrylates (for example, benzyl (meth)acrylate, phenyl (meth)acrylate, and phenoxyethyl (meth)acrylate), various alkyl carbitol (meth)acrylates (for example, ethyl carbitol (meth)acrylate), other various (meth)acrylate esters (for example, isobornyl (meth)acrylate, dicyclopentanyl (meth)acrylate, dicyclopentenyl (meth)acrylate, dicyclopentenyloxyethyl (meth)acrylate, and tetrahydrofurfuryl (meth)acrylate), various amino group-containing amide unsaturated monomers (for example, N-dimethylaminoethyl (meth)acrylamide, N-diethylaminoethyl (meth)acrylamide, N-dimethylaminopropyl (meth)acrylamide, and N-diethylamino propyl (meth)acrylamide), various dialkylaminoalkyl (meth)acrylates (for example, dimethylaminoethyl (meth)acrylate and diethylaminoethyl (meth)acrylate), various amino group-containing monomers (for example, tert-butylaminoethyl (meth)acrylate, tert-butylaminopropyl (meth)acrylate, aziridinylethyl (meth)acrylate, pyrrolidinylethyl (meth)acrylate, and piperidinylethyl (meth)acrylate), and the like.

A number average molecular weight of the thermosetting (meth)acrylic resin is preferably from 1,000 to 20,000 (more preferably from 1,500 to 15,000).

When the number average molecular weight thereof is in the range described above, smoothness and mechanical properties of the coating film are easily improved.

The number average molecular weight of the thermosetting (meth)acrylic resin is measured by gel permeation chromatography (GPC). The molecular weight measurement by GPC is performed with a THF solvent using GPC HLC-8120 GPC manufactured by Tosoh Corporation as a measurement device and column TSKgel Super HM-M (15 cm) manufactured by Tosoh Corporation. The weight average molecular weight and the number average molecular weight are calculated using a calibration curve of molecular weight created with a monodisperse polystyrene standard sample from results of this measurement.

Thermosetting Polyester Resin

The thermosetting polyester resin is, for example, a polycondensate obtained by polycondensing at least polybasic acid and polyol. The introduction of the thermosetting reactive group to the thermosetting polyester resin is performed by adjusting the used amount of polybasic acid and polyol. With this adjustment, a thermosetting polyester resin including at least one of a carboxyl group and a hydroxyl group as a thermosetting reactive group is obtained.

Examples of polybasic acid include terephthalic acid, isophthalic acid, phthalic acid, methylterephthalic acid, trimellitic acid, pyromellitic acid, or anhydrides thereof; succinic acid, adipic acid, azelaic acid, sebacic acid, or anhydrides thereof; maleic acid, itaconic acid, or anhydrides thereof; fumaric acid, tetrahydrophthalic acid, methyltetrahydrophthalic acid, hexahydrophthalic acid, methylhexahydrophthalic acid, or anhydrides thereof; cyclohexane dicarboxylic acid, 2,6-naphthalene dicarboxylic acid, and the like.

Examples of polyol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-hydroxyethyl terephthalate, cyclohexanedimethanol, octanediol, diethylpropane diol, butylethylpropane diol, 2-methyl-1,3-propane diol, 2,2,4-trimethylpentane diol, hydrogenated bisphenol A, an ethylene oxide adduct of hydrogenated bisphenol A, a propylene oxide adduct of hydrogenated bisphenol A, trimethylolethane, trimethylolpropane, glycerin, pentaerythritol, tris-hydroxyethyl isocyanurate, hydroxy pivalyl hydroxy pivalate, and the like.

The thermosetting polyester resin may be obtained by further polycondensing a monomer other than polybasic acid and polyol.

Examples of the other monomer include a compound including both a carboxyl group and a hydroxyl group in one molecule (for example, dimethanol propionic acid and hydroxy pivalate), a monoepoxy compound (for example, glycidyl ester of branched aliphatic carboxylic acid such as "Cardura E10 (manufactured by Shell)"), various monohydric alcohols (for example, methanol, propanol, butanol, and benzyl alcohol), various monobasic acids (for example, benzoic acid and p-tert-butyl benzoate), various fatty acids (for example, castor all fatty acid, coconut oil fatty acid, and soybean oil fatty acid), and the like.

The structure of the thermosetting polyester resin may be a branched structure or a linear structure.

Regarding the thermosetting polyester resin, the total of an acid value and a hydroxyl value is preferably from 10 mg KOH/g to 250 mg KOH/g, and the number average molecular weight is preferably from 1,000 to 100,000.

When the total of an acid value and a hydroxyl value is in the range described above, smoothness and a mechanical property of the coating film are easily improved. When the number average molecular weight is in the range described above, smoothness and a mechanical property of the coating film are improved and storage stability of the powder coating material is easily improved.

The measurement of the acid value and the hydroxyl value of the thermosetting polyester resin is performed based on JIS K-0070-1992. In addition, the measurement of the number average molecular weight of the thermosetting polyester resin is performed in the same manner as measurement of the number average molecular weight of the thermosetting (meth)acrylic resin.

The thermosetting resin may be used alone or in combination of two or more kinds thereof.

The content of the thermosetting resin is preferably 20% by weight to 99% by weight, and more preferably from 30% by weight to 95% by weight, with respect to the entirety of the powder particles.

In the case of using the thermosetting resin as the resin of the resin coating portion, the content of the thermosetting resin means content of the entire thermosetting resin in the core and the resin coating portion.

Thermosetting Agent

The thermosetting agent is selected depending on the kinds of the thermosetting reactive group of the thermosetting resin.

Here, the thermosetting agent means a compound having a reactable functional group with respect to the thermosetting reactive group which is a terminal group of the thermosetting resin.

When the thermosetting reactive group of the thermosetting resin is an epoxy group, specific examples of the thermosetting agent include acid such as succinic acid, glutaric acid, adipic acid, pimelic acid, suberic acid, azelaic acid, sebacic acid, dodecanedioic acid, eicosanoic diacid, maleic acid, citraconic acid, itaconic acid, glutaconic acid, phthalic acid, trimellitic acid, pyromellitic acid, tetrahydrophthalic acid, hexahydrophthalic acid, cyclohexene-1,2-dicarboxylic acid, trimellitic acid, and pyromellitic acid; anhydrides of these acids; urethane-modified products of these acids; and the like. Among these, as the thermosetting agent, aliphatic dibasic acid is preferably from the viewpoints of a physical property of the coating film and storage stability, and dodecanedioic acid is particularly preferable from the viewpoint of a physical property of the coating film.

When the thermosetting reactive group of the thermosetting resin is a carboxyl group, specific examples of the thermosetting agent include various epoxy resins (for example, polyglycidylether of bisphenol A), an epoxy group-containing acrylic resin (for example, glycidyl group-containing acrylic resin), various polyglycidylethers of polyol (for example, 1,6-hexanediol, trimethylol propane, and trimethylol ethane), various polyglycidylesters of polycarboxylic acid (for example, phthalic acid, terephthalic acid, isophthalic acid, hexahydrophthalic acid, methyl hexahydrophthalic acid, trimellitic acid, and pyromellitic acid), various alicyclic epoxy group-containing compounds (for example, bis(3,4-epoxy cyclohexyl) methyl adipate), hydroxy amide (for example, triglycidylisocyanurate and β-hydroxyalkyl amide), and the like.

When the thermosetting reactive group of the thermosetting resin is a hydroxyl group, examples of the thermosetting agent include blocked polyisocyanate, aminoplast, and the like. Examples of blocked polyisocyanate include organic diisocyanate such as various aliphatic diisocyanates (for example, hexamethylene diisocyanate and trimethyl hexamethylene diisocyanate), various alicyclic diisocyanates (for example, xylylene diisocyanate and isophorone diisocyanate), various aromatic diisocyanates (for example, tolylene diisocyanate and 4,4'-diphenylmethane diisocyanate); an adduct of the organic diisocyanate and polyol, a low-molecular weight polyester resin (for example, polyester polyol), or water; a polymer obtained by polymerization of these organic diisocyanates (a polymer including isocyanurate-type polyisocyanate compound); various polyisocyanate compounds blocked by a commonly used blocking agent such as isocyanate biuret product; a self-block polyisocyanate compound having a uretdione bond in a structural unit; and the like.

The thermosetting agent may be used alone or in combination as two or more kinds thereof.

The content of the thermosetting agent is preferably from 1% by weight to 30% by weight and more preferably from 3% by weight to 20% by weight, with respect to the thermosetting resin.

When the thermosetting resin is used as the resin of the resin coating portion, the content of the thermosetting agent means content of the entire thermosetting resin in the core and the resin coating portion.

Colorant

As a colorant, a pigment is used, for example. As the colorant, a dye may be used in combination with a pigment.

Examples of a pigment include an inorganic pigment such as iron oxide (for example, colcothar), titanium oxide, titanium yellow, zinc white, white lead, zinc sulfide, lithopone, antimony oxide, cobalt blue, and carbon black; an organic pigment such as quinacridone red, phthalocyanine blue, phthalocyanine green, permanent red, Hansa yellow, indanthrene Blue, Brilliant Fast Scarlet, and benzimidazolones yellow; and the like.

In addition, as the pigment, a brilliant pigment is also used. Examples of the brilliant pigment include metal powder such as a pearl pigment, aluminum powder, stainless steel powder; metallic flakes; glass beads; glass flakes; mica; and flake-shaped phosphorus iron oxide (MIO).

The colorant may be used alone or in combination of two or more kinds thereof.

The content of the colorant is determined depending on types of the pigment, and the hue, brightness, and the depth required for the coating film. The content of the colorant is, for example, preferably from 1% by weight to 70% by weight and more preferably from 2% by weight to 60% by weight, with respect to the entire resin in the core and the resin coating portion.

Other Additive

As the other additive, various additives used in the powder coating material are used. Specific examples of the other additive include a foam inhibitor (for example, benzoin or benzoin derivatives), a hardening accelerator (an amine compound, an imidazole compound, or a cationic polymerization catalyst), a plasticizer, a charge-controlling agent, an antioxidant, a pigment dispersant, a flame retardant, a fluidity-imparting agent, and the like.

Resin Coating Portion

The resin coating portion includes a resin.

The resin coating portion may be configured only of a resin, or may include other additives (the thermosetting agent described regarding the core, or other additives).

However, the resin coating portion is preferably configured only of a resin, in order to further reduce the bleeding of the inclusions in the powder particles. Even when the resin coating portion includes the other additives, the content of the resin is equal to or greater than 90% by weight (preferably equal to or greater than 95% by weight) with respect to the entire resin coating portion.

The resin of the resin coating portion may be a non-curable resin, or may be a thermosetting resin. However, the resin of the resin coating portion is preferably a thermosetting resin, in order to improve curing density (crosslinking density) of the coating film. When the thermosetting resin is used as the resin of the resin coating portion, as this thermosetting resin, the same thermosetting resin used for the thermosetting resin of the core is used. Particularly, when the thermosetting resin is used as the resin of the resin coating portion, the thermosetting resin is preferably at least one kind selected from the group consisting of a thermosetting (meth)acrylic resin and a thermosetting polyester resin. However, the thermosetting resin of the resin coating portion may be the same kind of resin as the thermosetting resin of the core or may be a different resin.

When the non-curable resin is used as the resin of the resin coating portion, the non-curable resin is preferably at least one kind selected from the group consisting of an acrylic resin and a polyester resin.

A coverage of the resin coating portion is preferably from 30% to 100% and more preferably from 50% to 100%, in order to prevent bleeding.

The coverage of the resin coating portion with respect to the surface of the powder particle is a value determined by X-ray photoelectron spectroscopy (XPS) measurement.

Specifically, in the XPS measurement, JPS-9000MX manufactured by JEOL Ltd. is used as a measurement device, and the measurement is performed by using an MgKα ray as the X-ray source and setting an accelerating voltage to 10 kV and an emission current to 30 mA.

The coverage of the resin coating portion with respect to the surface of the powder particles is determined by peak separation of a component derived from the material of the core on the surface of the powder particles and a component derived from a material of the resin coating portion, from the spectrum obtained under the conditions described above. In the peak separation, the measured spectrum is separated into each component using curve fitting by the least square method.

As the component spectrum to be a separation base, the spectrum obtained by singly measuring the thermosetting resin, a curing agent, a pigment, an additive, a coating resin used in preparation of the powder particle is used. In addition, the coverage is determined from a ratio of a spectral intensity derived from the coating resin with respect to the total of entire spectral intensity obtained from the powder particles.

The thickness of the resin coating portion is preferably from 0.2 μm to 4 μm and more preferably from 0.3 μm to 3 μm, in order to prevent bleeding.

The thickness of the resin coating portion is a value obtained by the following method. The powder particle is embedded in the epoxy resin, followed by cutting with a diamond knife to prepare a sliced piece. This sliced piece is observed using a transmission electron microscope (TEM) and plural of images of the cross section of the powder particles are imaged. The thicknesses of 20 portions of the resin coating portion are measured from the images of the cross section of the powder particle, and an average value thereof is used. When it is difficult to observe the resin coating portion in the image of the cross section due to a clear powder coating material, it is possible to easily perform the measurement by performing dyeing before observation.

Other Components of Powder Particle

The powder particle preferably contains di- or higher-valent metal ions (hereinafter, simply referred to as "metal ions"). The metal ions are components contained in both of the core and the resin coating portion of the powder particle. When di- or higher-valent metal ions are contained in the powder particle, ion crosslinking is formed in the powder particle by the metal ions. For example, when a polyester resin is used as the thermosetting resin of the core and the resin of the resin coating portion, a carboxyl group or a hydroxyl group of the polyester resin interacts with the metal ions and the ion crosslinking is formed. With this ion crosslinking, the bleeding of the powder particles is prevented, and the storage property is easily improved. In addition, after coating with the powder coating material, the bond of the ion crosslinking is broken due to heating at the time of thermal curing, and accordingly, the melt viscosity of the powder particle decreases and a coating film having excellent smoothness is easily formed.

Examples of the metal ions include divalent to tetravalent metal ions. Specifically, as the metal ions, at least one kind of metal ion selected from the group consisting of aluminum ions, magnesium ions, iron ions, zinc ions, and calcium ions is exemplified.

As a supply source of the metal ion (compound added to the powder particle as an additive), a metal salt, an inorganic metal salt polymer, a metal complex, and the like are used, for example. For example, when preparing the powder particle by an aggregation and coalescence method, the metal salt and the inorganic metal salt polymer are added to the powder particle as an aggregating agent.

Examples of the metal salt include aluminum sulfate, aluminum chloride, magnesium chloride, magnesium sulfate, Iron (II) chloride, zinc chloride, calcium chloride, calcium sulfate, and the like.

Examples of the inorganic metal salt polymer include polyaluminum chloride, polyaluminum hydroxide, iron (II) polysulfate, calcium polysulfide, and the like.

Examples of the metal complex include a metal salt of an aminocarboxylic acid and the like. Specific examples of the metal complex include metal salt (for example, calcium salt, magnesium salt, iron salt, and aluminum salt) using a well known chelate as a base such as ethylenediamine tetraacetic acid, propanediamine tetraacetic acid, nitrilotriacetic acid, triethylenetetramine hexaacetic acid, diethylenetriamine pentacetic acid, and the like.

Such a supply source of the metal ions may not be used as an aggregating agent, but may be added simply as an additive.

As the valence of the metal ions is high, mesh ion crosslinking is easily formed, and it is preferable from the viewpoints of smoothness of the coating film and the storage properties of the powder coating material. Accordingly, the metal ions are preferably Al ions. That is, the supply source of the metal ions is preferably an aluminum salt (for example, aluminum sulfate or aluminum chloride), or an aluminum salt polymer (for example, polyaluminum chloride or polyaluminum hydroxide). Among the supply sources of the metal ions, the inorganic metal salt polymer is preferable, compared to the metal salt, even though the valences of the metal ions thereof are the same as each other, from the viewpoints of smoothness of the coating film and the storage properties of the powder coating material.

Accordingly, the supply source of the metal ions is particularly preferably an aluminum salt polymer (for example, polyaluminum chloride or polyaluminum hydroxide).

The content of the metal ions is preferably 0.002% by weight to 0.2% by weight and more preferably from 0.005% by weight to 0.15% by weight, with respect to the entire powder particle, from the viewpoints of smoothness of the coating film and the storage properties of the powder coating material.

When the content of the metal ions is equal to or greater than 0.002% by weight, suitable ion crosslinking is formed by the metal ions, bleeding of the powder particles is prevented, and the storage properties of the powder coating material are easily improved. Meanwhile, when the content of the metal ions is equal to or smaller than 0.2% by weight, the formation of excessive ion crosslinking by the metal ions is prevented, and therefore the smoothness of the coating film is easily improved.

Herein, when preparing the powder particles by an aggregation and coalescence method, the supply source of the metal ions added as an aggregating agent (metal salt or metal salt polymer) contributes to controlling the particle diameter distribution and shapes of the powder particles.

Specifically, high valence of the metal ions is preferable, in order to obtain a narrow particle diameter distribution. In addition, in order to obtain a narrow particle diameter distribution, a metal salt polymer is preferable, compared to the metal salt, even though the valences of the metal ions thereof are the same as each other. Accordingly, from the viewpoints described above, the supply source of the metal ions is preferably an aluminum salt (for example, aluminum sulfate or aluminum chloride) and an aluminum salt polymer (for example, polyaluminum chloride or polyaluminum hydroxide), and particularly preferably an aluminum salt polymer (for example, polyaluminum chloride or polyaluminum hydroxide).

When the aggregating agent is added so that the content of the metal ions is equal to or greater than 0.002% by weight, aggregation of the resin particles in the aqueous medium proceeds, and this contributes to realization of the narrow particle diameter distribution. The aggregation of the resin particle to be the resin coating portion proceeds with respect to the aggregated particles to be the core, and this contributes to realization of the formation of the resin coating portion with respect to the entire surface of the core. Meanwhile, when the aggregating agent is added so that the content of the metal ions is equal to or smaller than 0.2% by weight, the formation of excessive creating of ion crosslinking in the aggregated particles is prevented, and the shape of the powder particles generated when performing coalescence is easily set to be close to a sphere. Accordingly, from the viewpoints described above, the content of the metal ions is preferably from 0.002% by weight to 0.2% by weight and more preferably from 0.005% by weight to 0.15% by weight.

The content of the metal ions is measured by quantitative analysis of fluorescent X-ray intensity of the powder particles. Specifically, for example, first the resin and the supply source of the metal ions are mixed with each other, to thereby obtain a resin mixture having a prescribed concentration of the metal ions. A pellet sample is obtained with 200 mg of this resin mixture by using a tableting tool having a diameter of 13 mm. The weight of this pellet sample is precisely weighed, and the fluorescent X-ray intensity of the pellet sample is measured to obtain peak intensity. In the same manner as described above, the measurement is performed for the pellet sample with the changed added amount of the supply source of the metal ions, and a calibration curve is created with the results. The quantitative analysis of the content of the metal ions in the powder particle to be a measurement target is performed by using this calibration curve.

Examples of an adjusting method of the content of the metal ions include 1) a method of adjusting the added amount of the supply source of the metal ions, 2) in a case of preparing the powder particles by an aggregation and coalescence method, a method of adjusting the content of the metal ions by adding an aggregating agent (for example, a metal salt or a metal salt polymer) as the supply source of the metal ions in an aggregation step, adding a chelating agent (for example, ethylenediamine tetraacetic acid (EDTA), diethylenetriamine pentacetic acid (DTPA), or nitrilotriacetic acid (NTA)) at a last stage of the aggregation step, forming a complex with the metal ions by the chelating agent, and removing the formed complex salt in a washing step.

Preferable Properties of Powder Particles

Volume Average Particle Diameter Distribution Index GSDv

In the exemplary embodiment, the volume average particle diameter distribution index GSDv of the powder particles is preferably equal to or less than 1.50, more preferably equal to or less than 1.40, most preferably equal to or less than 1.30 in terms of the smoothness of the coating film, and the storage property of the powder coating material.

Volume Average Particle Diameter D50v

In addition, the volume average particle diameter D50v of the powder particles is preferably from 1 μm to 25 μm, more preferably from 2 μm to 20 μm, and most preferably from 3 μm to 15 μm, in terms of forming the coating film which is excellent in the smoothness with a small amount thereof.

Average Circularity

Furthermore, the average circularity of the powder particles is preferably equal to or greater than 0.96, more preferably equal to or greater than 0.97, and most preferably equal to or greater than 0.98 in terms of the smoothness of the coating film, and the storage property of the powder coating material.

Here, the volume average particle diameter D50v and the volume average particle diameter distribution index GSDv of the powder particles are measured using a Coulter Multisizer II (manufactured by Beckman Coulter, Inc.) and ISOTON-II (manufactured by Beckman Coulter, Inc.) as an electrolyte.

In the measurement, from 0.5 mg to 50 mg of a measurement sample is added to 2 ml of a 5% aqueous solution of surfactant (preferably sodium alkylbenzene sulfonate) as a dispersant. The obtained material is added to from 100 ml to 150 ml of the electrolyte.

The electrolyte in which the sample is suspended is subjected to a dispersion treatment using an ultrasonic disperser for 1 minute, and a particle diameter distribution of particles having a particle diameter from 2 μm to 60 μm is measured by a Coulter Multisizer II using an aperture having an aperture diameter of 100 μm. Moreover, 50,000 particles are sampled.

Cumulative distributions by volume are drawn from the side of the smallest diameter with respect to particle diameter ranges (channels) separated based on the measured particle diameter distribution. The particle diameter when the cumulative percentage becomes 16% is defined as a volume average particle diameter D16v, while the particle diameter when the cumulative percentage becomes 50% is defined as a volume average particle diameter D50v. Furthermore, the particle diameter when the cumulative percentage becomes 84% is defined as a volume average particle diameter D84v.

Furthermore, the volume average particle diameter distribution index (GSDv) is calculated as $(D84v/D16v)^{1/2}$.

The average circularity of powder particles is measured by using a flow-type particle image analyzer "FPIA-3000 (manufactured by Sysmex Corporation)". Specifically, from 0.1 ml to 0.5 ml of a surfactant (alkylbenzene sulfonate) as a dispersant is added to from 100 ml to 150 ml of water in which solid impurities are removed in advance, and from 0.1 g to 0.5 g of a measurement sample is added thereto. The suspension in which the measurement sample is dispersed is subjected to a dispersion treatment using an ultrasonic disperser for from 1 minute to 3 minutes, and the concentration of the dispersion is made to be from 3,000 particles/μl to 10,000 particles/μl. A measurement of the average circularity of powder particles is performed on the dispersion using a flow-type particle image analyzer.

Here, the average circularity of powder particles is a value obtained by determining a circularity (Ci) of each particle of n particles measured with respect to the powder particles and calculating by the following equation. Here, in the following equation, Ci represents a circularity (=perimeter of a circle having area equal to the projected area of a particle/perimeter of the projected image of a particle), and fi represents a frequency of the powder particles.

$$\text{Average circularity (Ca)} = \left(\sum_{i=1}^{n} (Ci \times fi)\right) / \sum_{i=1}^{n} (fi) \quad \text{Equation}$$

External Additive

In the powder coating material according to the exemplary embodiment, since the external additive prevents generation of aggregation between the powder particles by adding the external additive to the surface of the powder particles, the coating film having the excellent smoothness with a small amount is formed.

Specific examples of the external additive include inorganic particles.

Examples of the inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

Surfaces of the inorganic particles as an external additive are preferably subjected to a hydrophobizing treatment. The hydrophobizing treatment is performed by, for example, dipping the inorganic particles in a hydrophobizing agent. The hydrophobizing agent is not particularly limited and examples thereof include a silane coupling agent, silicone oil, a titanate coupling agent, and an aluminum coupling agent. These may be used alone or in combination of two or more kinds thereof.

Generally, the amount of the hydrophobizing agent is, for example, from 1 part by weight to 10 parts by weight with respect to 100 parts by weight of the inorganic particles.

The amount of the external additive externally added is, for example, preferably from 0.01% by weight to 5% by weight and more preferably from 0.01% by weight to 2.0% by weight, with respect to the powder particles.

Manufacturing Method of Powder Coating Material

Next, a manufacturing method of the powder coating material according to the exemplary embodiment will be described.

After manufacturing the powder particles, the powder coating material according to the exemplary embodiment is obtained by externally adding the external additives to the powder particles, if necessary.

The powder particles may be manufactured using any of a dry manufacturing method (e.g., kneading and pulverizing method) and a wet manufacturing method (e.g., aggregation and coalescence method, suspension and polymerization method, and dissolution and suspension method). The powder particle manufacturing method is not particularly limited to these manufacturing methods, and a known manufacturing method is employed.

Among these, the powder particles are preferably obtained by an aggregation and coalescence method, in terms of that it is possible to easily control the volume average particle diameter distribution index GSDv, the volume average particle diameter D50v, and the average circularity to be in a preferable range described above.

Specifically, the powder particles are preferably manufactured by performing: a step of forming first aggregated particles by aggregating the emulsified dispersion particle of a surface adjusting agent, first resin particles and a thermosetting agent in dispersion in which the emulsified dispersion particle of a surface adjusting agent, the first resin particles containing a thermosetting resin, and the thermosetting agent are dispersed, or by aggregating composite particles in a dispersion in which composite particles containing the surface adjusting agent, a thermosetting resin and a thermosetting agent are dispersed; a step of forming second aggregated particles which have second resin particles attached to the surface of the first aggregated particles by mixing first aggregated particle dispersion in which the first aggregated particles are dispersed and a second resin particle dispersion in which second resin particles containing a resin are dispersed, with each other, aggregating the second resin particles on the surface of the first aggregated particles; and a step of heating second aggregated particle dispersion in which the second aggregated particles are dispersed to coalesce the second aggregated particles.

In the powder particle manufactured by this aggregation and coalescence method, a coalesced portion of the first aggregated particles is the core, and the coalesced portion of the second resin particles attached to the surface of the first aggregated particles is the resin coating portion.

Hereinafter, the respective steps will be described in detail.

In the following description, a manufacturing method of powder particles containing a colorant will be described, but the colorant is only used if necessary.

Dispersion Preparation Step

First, each dispersion used in the aggregation and coalescence method is prepared. Specifically, a surface adjusting agent dispersion obtained by emulsifying and dispersing a surface adjusting agent, a first resin particle dispersion in which first resin particles containing a thermosetting resin of the core are dispersed, a thermosetting agent dispersion in which a thermosetting agent is dispersed, a colorant dispersion in which a colorant is dispersed, and a second resin particle dispersion in which second resin particles containing the resin of the resin coating portion are dispersed, are prepared.

In addition, a composite particle dispersion in which composite particles containing a surface adjusting agent, a thermosetting resin and a thermosetting agent, for the core, are dispersed is prepared, instead of the surface adjusting agent dispersion, the first resin particle dispersion and the thermosetting agent dispersion.

In the powder coating material preparation step, the first resin particles, the second resin particles, and the composite particles are collectively described as the "resin particles" and the dispersion of the resin particles are described as "resin particle dispersion".

Herein, resin particle dispersion is, for example, prepared by dispersing the resin particles in a dispersion medium with a surfactant.

An aqueous medium is used, for example, as the dispersion medium used in the resin particle dispersion.

Examples of the aqueous medium include water such as distilled water, ion exchange water, or the like, alcohols, and the like. The medium may be used alone or in combination of two or more kinds.

Examples of the surfactant include anionic surfactants such as sulfuric ester salt, sulfonate, phosphate ester, and soap anionic surfactants; cationic surfactants such as amine salt and quaternary ammonium salt cationic surfactants; and nonionic surfactants such as polyethylene glycol, alkyl phenol ethylene oxide adduct, and polyol nonionic surfactants. Among these, anionic surfactants and cationic surfactants are particularly used. Nonionic surfactants may be used in combination with anionic surfactants or cationic surfactants.

The surfactants may be used alone or in combination of two or more kinds thereof.

Regarding the resin particle dispersion, as a method of dispersing the resin particles in the dispersion medium, a common dispersing method using, for example, a rotary shearing-type homogenizer, or a ball mill with media, a sand mill, or a dyno mill is exemplified. Depending on the kind of the resin particles, the resin particles may be dispersed in the resin particle dispersion using, for example, a phase inversion emulsification method.

The phase inversion emulsification method includes: dissolving a resin to be dispersed in a hydrophobic organic solvent in which the resin is soluble; conducting neutralization by adding abase to an organic continuous phase (O phase); and converting the resin (so-called phase inversion) from W/O to O/W by adding an aqueous medium (W phase) to form a discontinuous phase, thereby dispersing the resin as particles in the aqueous medium.

A specific preparing method of the resin particle dispersion is as follows.

For example, in the case where the resin particle dispersion is an acrylic resin particle dispersion in which the acrylic resin particles are dispersed, a raw material monomer is emulsified in an aqueous medium, and a water-soluble initiator, and if necessary, a chain transfer agent for controlling molecular weight are added thereto and heated to perform emulsification and polymerization, and accordingly, the acrylic resin particle dispersion is obtained.

In addition, in the case where the resin particle dispersion is a polyester resin particle dispersion in which polyester resin particles are dispersed, a raw material monomer is heated, melted, and polycondensed under reduced pressure to obtain a polycondensation product, a solvent (for example, ethyl acetate) is added to the obtained polycondensation product to dissolve the product, and the obtained solution is stirred while adding a weak alkaline aqueous solution thereto, whereby phase inversion emulsification is performed to obtain the polyester resin particle dispersion.

Meanwhile, when the resin particle dispersion is the composite particle dispersion, the surface adjusting agent, the thermosetting resin and the thermosetting agent are mixed with each other, and are dispersed (for example, subjected to emulsification such as phase inversion emulsification) in a dispersion medium, and accordingly the composite particle dispersion is obtained.

The volume average particle diameter of the resin particles dispersed in the resin particle dispersion is, for example, preferably equal to or smaller than 1 μm, more preferably from 0.01 μm to 1 μm, even more preferably from 0.08 μm to 0.8 μm, and still more preferably from 0.1 μm to 0.6 μm.

Regarding the volume average particle diameter of the resin particles, a cumulative distribution by volume is drawn from the side of the smallest diameter with respect to particle diameter ranges (channels) separated using the particle diameter distribution obtained by the measurement of a laser diffraction-type particle diameter distribution measuring device (for example, manufactured by Horiba, Ltd., LA-700), and a particle diameter when the cumulative percentage becomes 50% with respect to the entire particles is measured as a volume average particle diameter D50v. The volume average particle diameter of the particles in other dispersions is also measured in the same manner.

The content of the resin particles contained in the resin particle dispersion is, for example, preferably from 5% by weight to 50% by weight, and more preferably from 10% by weight to 40% by weight.

For example, the thermosetting agent dispersion and the colorant dispersion are also prepared in the same manner as in the case of the resin particle dispersion. That is, the above description regarding the volume average particle diameter of the resin particles, the dispersion medium, the dispersing method, and the content of the particles in the resin particle dispersion are as applicable to the particles of the colorant dispersed in the colorant dispersion and the particles of the thermosetting agent dispersed in the thermosetting agent dispersion.

In addition, the surface adjusting agent dispersion in which the surface adjusting agent are dispersed and emulsified is also prepared by using an emulsifier such as the surfactant similarly to the resin particle dispersion. The surfactant which is exemplified with respect to the aforementioned resin particle dispersion may be used as the surfactant.

The volume average particle diameter of the emulsified dispersion particle in the surface adjusting agent dispersion is, for example, preferably equal to or smaller than 0.5 μm and equal to or greater than 0.0001 μm, and more preferably equal to or smaller than 0.1 μm and equal to or greater than 0.01 μm.

The volume average particle diameter of the emulsified dispersion particle is measured similarly to the case of the volume average particle diameter of the resin particle.

A content of the emulsified dispersion particle contained in the surface adjusting agent dispersion, for example, is preferably from 1.0% by weight to 60% by weight, and more preferably from 10% by weight to 50% by weight.

First Aggregated Particle Forming Step

Next, the surface adjusting agent dispersion, the first resin particle dispersion, the thermosetting agent dispersion, and the colorant dispersion are mixed with each other.

The surface adjusting agent dispersion, the first resin particles, the thermosetting agent, and the colorant are heterogeneously aggregated in the mixed dispersion, thereby forming first aggregated particles having a diameter near a target powder particle diameter and including the surface adjusting agent dispersion, the first resin particles, the thermosetting agent, and the colorant.

Specifically, for example, an aggregating agent is added to the mixed dispersion and a pH of the mixed dispersion is adjusted to be acidic (for example, the pH is from 2 to 5). If necessary, a dispersion stabilizer is added. Then, the mixed dispersion is heated at a temperature of a glass transition temperature of the first resin particles (specifically, for example, from a temperature 30° C. lower than the glass transition temperature to a temperature 10° C. lower than the glass transition temperature of the first resin particles) to aggregate the particles dispersed in the mixed dispersion, thereby forming the first aggregated particles.

In the first aggregated particle forming step, the first aggregated particles may be formed by mixing the composite particle dispersion including the surface adjusting agent, the thermosetting resin and the thermosetting agent, and the colorant dispersion with each other and heterogeneously aggregating the composite particle and the colorant in the mixed dispersion.

In the first aggregated particle forming step, for example, the aggregating agent may be added at room temperature (for example, 25° C.) while stirring of the mixed dispersion using a rotary shearing-type homogenizer, the pH of the mixed dispersion may be adjusted to be acidic (for example, the pH is from 2 to 5), a dispersion stabilizer may be added if necessary, and the above heating may then be performed.

Examples of the aggregating agent include a surfactant having an opposite polarity to the polarity of the surfactant used as the dispersing agent to be added to the mixed dispersion, a metal salt, a metal salt polymer, and a metal complex. When a metal complex is used as the aggregating agent, the amount of the surfactant used is reduced and charging characteristics are improved.

After completing the aggregation, an additive for forming a bond to a metal ion of the aggregating agent to form a complex or a bond similar thereto may be used, if necessary. A chelating agent is suitably used as this additive. With the addition of this chelating agent, the content of the metal ions of the powder particles may be adjusted when the aggregating agent is excessively added.

Herein, the metal salt, the metal salt polymer, or the metal complex as the aggregating agent is used as a supply source of the metal ions. These examples are as described above.

A water-soluble chelating agent is exemplified as the chelating agent. Specific examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is, for example, preferably from 0.01 parts by weight to 5.0 parts by weight, and more preferably from 0.1 parts by weight to less than 3.0 parts by weight with respect to 100 parts by weight of the resin particles.

Second Aggregated Particle Forming Step

Next, the obtained first aggregated particle dispersion in which the first aggregated particles are dispersed is mixed together with the second resin particle dispersion.

Meanwhile, the second resin particles may be the same kind as the first resin particles or may be not.

The second resin particles are aggregated to be attached to the surface of the first aggregated particles in the mixed dispersion in which the first aggregated particles and the second resin particles are dispersed, thereby forming second aggregated particles in which the second resin particles are attached to the surface of the first aggregated particles.

Specifically, in the first aggregated particle forming step, for example, when the particle diameter of the first aggregated particles reaches a target particle diameter, the second resin particle dispersion is mixed with the first aggregated particle dispersion, and the mixed dispersion is heated at a temperature equal to or lower than the glass transition temperature of the second resin particles.

pH of the mixed dispersion is set to be in a range of 6.5 to 8.5, for example, to thereby stop the progress of the aggregation.

Accordingly, the second aggregated particles in which the second resin particles are aggregated to be attached to the surface of the first aggregated particles are obtained.

Coalescence Step

Next, the second aggregated particle dispersion in which the second aggregated particles are dispersed is heated at, for example, a temperature that is equal to or higher than the glass transition temperature of the first and second resin particles (for example, a temperature that is higher than the glass transition temperature of the first and second resin particles by 10° C. to 30° C.) to coalesce the second aggregated particles and form the powder particles.

The powder particles are obtained through the foregoing steps.

Herein, after the coalescence step ends, the powder particles formed in the dispersion are subjected to a washing step, a solid-liquid separation step, and a drying step, that are well known, and thus dry powder particles are obtained.

In the washing step, it is preferable that displacement washing using ion exchange water is sufficiently performed from the viewpoint of charging properties. In addition, the solid-liquid separation step is not particularly limited, but suction filtration, pressure filtration, or the like is preferably performed from the viewpoint of productivity. The method for the drying step is also not particularly limited, but freeze drying, airflow drying, fluidized drying, vibration-type fluidized drying, or the like is preferably performed from the viewpoint of productivity.

The powder coating material according to the exemplary embodiment is manufactured by adding and mixing, for example, an external additive to the obtained dry powder particles, if necessary. The mixing is preferably performed with, for example, a V-blender, a Henschel mixer, a Lodige mixer, or the like. Furthermore, if necessary, coarse particles of the toner may be removed using a vibration sieving machine, a wind-power sieving machine, or the like.

Coated Article/Manufacturing Method of Coated Article

A coated article according to the exemplary embodiment is a coated article having a coating film, which is formed by the powder coating material according to the exemplary embodiment, on the surface. As a manufacturing method of the coated article according to the exemplary embodiment, there is a manufacturing method of the coated article of performing coating with the powder coating material according to the exemplary embodiment.

Specifically, after coating a surface to be coated with the powder coating material, a coating film having the powder coating material is cured by heating (baking) to thereby obtain a coated article.

In the coating with the powder coating material, a well-known coating method such as electrostatic powder coating, frictional charge powder coating, or fluidized dipping is used. The thickness of the coating film of the powder coating material is, for example, preferably from 30 µm to 50 µm.

A heating temperature (baking temperature) is, for example, preferably from 90° C. to 250° C., more preferably from 100° C. to 220° C., and even more preferably from 120° C. to 200° C. The heating time (baking time) is adjusted depending on the heating temperature (baking temperature).

The coating and the heating (baking) of the powder coating material may be simultaneously performed.

A target product to be coated with the powder coating material is not particularly limited, and various metal components, ceramic components, or resin components are used. These target products may be uncompleted products which are not yet molded to the products such as a plate-shaped product or a linear product, and may be molded products which are molded to be used in an electronic component, a road vehicle, or an interior and exterior material of a building. In addition, the target product may be a product including a surface to be coated which is subjected to a surface treatment such as a primer treatment, a plating treatment, or an electrodeposition coating, in advance.

EXAMPLES

Hereinafter, the exemplary embodiment will be described in detail using examples, but is not limited to these examples. In the following description, unless specifically noted, "parts" and "%" are based on the weight.

First Resin Particle Dispersion (1)
Styrene: 320 parts
n-butyl acrylate: 80 parts
Acrylic acid: 10 parts
Dodecanethiol: 10 parts
Nonionic surfactant (Nonypol 400 manufactured by Sanyo Kasei Kogyo K.K.): 6 parts
Anionic surfactant (Neogen R manufactured by Daiichi Kogyo Seiyaku Co., Ltd.): 10 parts
Ion exchange water: 550 parts The above described materials are dispersed and emulsified in a flask, are gently mixed and stirred for 10 minutes, and 50 parts of ion exchange water in which 4 parts of ammonium persulfate is dissolved are added thereto. After that, nitrogen substitution is performed, the solution is heated to be 70° C. in an oil bath while stirring the solution in the flask, and then emulsion polymerization is continued for 5 hours, thereby obtaining the first resin particle dispersion (1).

Regarding the dispersion, the volume average particle diameter (D50) of the resin particle which is measured by using a laser diffraction particle diameter measurer (LA-700 manufactured by HORIBA, Ltd.) is 155 nm, a glassy-transition temperature of the resin which is measured by using a differential scanning calorimeter (DSC-50 manufactured by SHIMADZU CORPORATION) at a rate of temperature increase of 10° C./min is 54° C., and a weight average molecular weight (polystyrene conversion) which is measured with tetrahydrofuran (THF) as a solvent by using a molecular weight measuring device (HLC-8020 manufactured by Tosoh Corporation) is 33,000.

Second Resin Particle Dispersion (2)
Styrene: 80 parts
n-butyl acrylate: 20 parts
Acrylic acid: 2.5 parts
Dodecanethiol: 2.5 parts
Nonionic surfactant (Nonypol 400 manufactured by Sanyo Kasei kogyo K.K.): 1.5 parts
Anionic surfactant (Neogen R manufactured by Daiichi Kogyo Seiyaku Co., Ltd.): 1.5 parts
Ion exchange water: 150 parts The above described materials are dispersed and emulsified in a flask, are gently mixed and stirred for 10 minutes, and 50 parts of ion exchange water in which 1.0 parts of ammonium persulfate is dissolved are added thereto. After that, nitrogen substitution is performed, the solution is heated to be 70° C. in an oil bath while stirring the solution in the flask, and then emulsion polymerization is continued for 5 hours, thereby obtaining the second resin particle dispersion (2).

Regarding the dispersion, the volume average particle diameter (D50) of the resin particle which is measured by using a laser diffraction particle diameter measurer (LA-700 manufactured by HORIBA, Ltd.) is 155 nm, a glass transition temperature of the resin which is measured by using a differential scanning calorimeter (DSC-50 manufactured by SHIMADZU CORPORATION) at a rate of temperature increase of 10° C./min is 54° C., and a weight average molecular weight (polystyrene conversion) which is measured with THF as a solvent by using a molecular weight measuring device (HLC-8020 manufactured by Tosoh Corporation) is 31,000.

Colorant Dispersion (K)
Carbon black (Nipx35 manufactured by Evonik Industries): 50 parts
Anionic surfactant (Neogen R manufactured by Daiichi Kogyo Seiyaku Co., Ltd.): 5 parts
Ion exchange water: 200 parts A colorant dispersion (K) is obtained by mixing the above described materials and performing a dispersion treatment for one hour by using a high pressure impact type dispersing machine ULTIMIZER (HJP30006 manufactured by Sugino Machine, Ltd.). An average particle diameter of colorant particles in the colorant dispersion (K) is 190 nm and the solid content of the colorant dispersion is 20%.

Example 1

Preparation of Powder Particles (1)
First resin particle dispersion (1): 260 parts
Thermosetting agent (VESTAGON B1530 manufactured by Daicel-Evonik Ltd.): 20 parts
Silicone oil emulsion (solid content of 53%): 25 parts
(X-52-8048 manufacturedby Shin-Etsu Chemical Co., Ltd.: silicone oil emulsion containing a long chain alkyl group)
Colorant dispersion (K): 32.7 parts
Cationic surfactant (SANISOL B50 manufactured by Kao Corporation): 1.5 parts
Polyaluminum Chloride: 0.36 Parts
Ion exchange water: 1000 parts The above materials are mixed and dispersed in a round stainless steel flask using a homogenizer (ULTRA-TURRAX T50 manufactured by IKA Ltd.), and heated to 48° C. while stirring in the flask in the heating oil bath. Formation of the aggregated particles is confirmed by using an optical microscope after holding the resultant material at 48° C. for 30 minutes.

130 parts of a second resin particle dispersion (2) is added to the above resultant. Thereafter, the pH of the liquid is adjust to 8.0 by using a sodium hydroxide aqueous solution of which concentration is 0.5 mol/L, the flask is air-tightly sealed, the solution is heated to 90° C. while continuously stirring the solution by causing the sealing of the stirring shaft to be magnetically performed, and is further held for three hours. After completing the reaction, the solution in the flask is cooled, and then the solid-liquid separation is performed by Nutsche-type suction filtration. The solid content is redispersed in 1000 parts of ion exchange water at 30° C. and is stirred by using a stirring blade at 300 rpm for 15, and then the solid-liquid separation is performed by the Nutsche-type suction filtration. The redispersion and the suction filtration are repeatedly performed, and the washing is completed in a state where electric conductivity of filtrate is equal to or less than 10.0 μS/cmt.

Next, the resultant is continuously dried for 12 hours by using a vacuum dryer, thereby obtaining the powder particles (1).

The core of the powder particles (1) has the sea-island structure, the diameter of the island portion formed by the silicone oil is 0.1 μm.

In addition, the volume average particle diameter D50v of the powder particles (1) is 5.8 μm, the volume average particle diameter distribution index GSDv is 1.25, and the average circularity is 0.97.

Furthermore, content of aluminum ions of the powder particles (1) is 0.01% by weight.

When an image of the cross section of the particles is observed by transmission electron microscope by embedding the powder particles (1) in the epoxy resin, and then cutting the embedded powder particles, it is confirmed that the surface of the powder particle is coated with the resin coating portion.

Preparation of Powder Coating Material (1)

0.5 parts by weight of hydrophobic titania particles (primary particle diameter of 50 nm) is mixed to 100 parts by weight of the obtained powder particles (1) as the external additive to thereby obtain the powder coating material (1).

Example 2

The powder particles (2) are obtained under the same conditions as in Example 1 except for changing the silicone oil emulsion used in Example 1 to an emulsion of "silicone oil containing a methacrylic group (X-22-2426 manufactured by Shin-Etsu Chemical Co., Ltd.)" which is prepared as described below, and setting the added amount as in Example 1.

Preparation of Silicone Oil Emulsion

Silicone oil containing a methacrylic group: 480 parts
(X-22-2426 Manufactured by Shin-Etsu Chemical Co., Ltd.)
Anionic surfactant (Neogen RK manufactured by Daiichi Kogyo Seiyaku Co., Ltd.): 50 parts
Ion exchange water: 520 parts The temperature of the mixed solution of the above components is adjusted to 30° C., and the mixed solution is dispersed using a homogenizer (ULTRA-TURRAX T50 manufactured by IKA Ltd.), and then are subjected to dispersion treatment with a Manton-Gaulin high pressure homogenizer (manufactured by Gaulin Co., Ltd.), and accordingly, the silicone oil emulsion (solid content of 48%) is prepared.

The core of the obtained powder particles (2) has the sea-island structure, the diameter of the island portion formed by the silicone oil is 0.005 μm.

In addition, the volume average particle diameter D50v of the powder particles (2) is 5.6 μm, the volume average particle diameter distribution index GSDv is 1.21, and the average circularity is 0.98.

Furthermore, content of aluminum ions of the powder particles (2) is 0.005% by weight.

Then, the powder coating material (2) is obtained under the same condition as in Example 1 except for using the powder particles (2).

Example 3

The powder particles (3) are obtained under the same conditions as in Example 1 except for changing the silicone oil emulsion used in Example 1 to "silicone oil emulsion (solid content of 48%) containing a methacrylic group (X-52-8164A manufactured by Shin-Etsu Chemical Co., Ltd.)", and setting the added amount as in Example 1.

The core of the obtained powder particles (3) has the sea-island structure, the diameter of the island portion formed by the silicone oil is 0.02 μm.

In addition, the volume average particle diameter D50v of the powder particles (3) is 5.5 μm, the volume average particle diameter distribution index GSDv is 1.23, and the average circularity is 0.96.

Furthermore, content of aluminum ions of the powder particles (3) is 0.02% by weight.

Then, the powder coating material (3) is obtained under the same condition as in Example 1 except for using the powder particles (3).

Example 4

The powder particles (4) are obtained under the same conditions as in Example 1 except for changing the silicone oil emulsion used in Example 1 to "silicone oil emulsion (solid content of 30%) containing a methacrylic group (KM-9739 manufactured by Shin-Etsu Chemical Co., Ltd.)", and setting the added amount as in Example 1.

The core of the obtained powder particles (4) has the sea-island structure, the diameter of the island portion formed by the silicone oil is 0.05 μm.

In addition, the volume average particle diameter D50v of the powder particles (4) is 5.8 μm, the volume average particle diameter distribution index GSDv is 1.22, and the average circularity is 0.96.

Furthermore, content of aluminum ions of the powder particles (4) is 0.007% by weight.

Then, the powder coating material (4) is obtained under the same condition as in Example 1 except for using the powder particles (4).

Example 5

The powder particles (5) are obtained under the same conditions as in Example 1 except for changing the silicone oil emulsion used in Example 1 to an emulsion of "dimethyl silicone oil (KF-96-1000cs manufactured by Shin-Etsu Chemical Co., Ltd.)" which is prepared as described below, and setting the added amount as in Example 1.

Preparation of Silicone Oil Emulsion

Dimethyl silicone oil: 480 parts
(KF-96-1000cs manufactured by Shin-Etsu Chemical Co., Ltd.)
Anionic surfactant (Neogen RK manufactured by Daiichi Kogyo Seiyaku Co., Ltd.): 50 parts
Ion exchange water: 520 parts The temperature of the mixed solution of the above components is adjusted to 30° C., and the mixed solution is dispersed using a homogenizer (ULTRA-TURRAX T50 manufactured by IKA Ltd.), and then are subjected to dispersion treatment with a Manton-Gaulin high pressure homogenizer (manufactured by Gaulin Co., Ltd.), and accordingly, the silicone oil emulsion (solid content of 48%) is prepared.

The core of the obtained powder particles (5) has the sea-island structure, the diameter of the island portion formed by the silicone oil is 0.01 μm.

In addition, the volume average particle diameter D50v of the powder particles (5) is 5.7 the volume average particle diameter distribution index GSDv is 1.24, and the average circularity is 0.98.

Furthermore, content of aluminum ions of the powder particles (5) is 0.01% by weight.

Then, the powder coating material (5) is obtained under the same condition as in Example 1 except for using the powder particles (5).

Comparative Example 1

The core/shell type resin particle (E1) which is obtained in Example 1 disclosed in JP-A-2010-090355 is used as Comparative example 1.

In the resin particle (E1), a domain structure (the island portion) obtained by an agent for the surface smoothness, such as wax, is not found, but only the colorant is found.

The powder coating material is obtained under the same condition as in Example 1 except for using the resin particles (E1).

Evaluation

Manufacturing of Coating Film Sample of Powder Coating Material

The powder coating material obtained in each example is coated on a test panel of ZINC phosphate treated steel plate by an electrostatic coating method or the like, and heated (baked) at a heating temperature of 180° C. for a heating time of 1 hour, and a coating film sample having the thickness of 30 μm is obtained.

Evaluation of Smoothness of Coating Film

The center line average roughness (hereinafter, referred to as "Ra". unit: μm) of the surface of the coating film sample is measured by using a surface roughness measuring instrument (SURFCOM 1400A, manufactured by Tokyo Seimitsu Co., Ltd.).

Moreover, it shows that as a number of Ra increases, surface smoothness decreases.

Evaluation criteria are as follows. Evaluation results of the samples are shown in Table 1 below.

G1 (A): Ra is equal to or less than 0.4 μm
G2 (B): Ra is greater than 0.4 μm and equal to or less than 0.5 μm
NG (C): Ra is greater than 0.5 μm Evaluation of Storage Resistance After storing the powder coating material obtained in each example for 17 hours in a thermo-hygrostat bath in which the temperature is controlled to 50° C. and humidity is controlled to 50 RH %, an amount of the powder coating material passing through 200 mesh (aperture of 75 microns (μm)) is examined by using a vibration screen and is estimated based on the following standard. Evaluation results of the samples are shown in Table 1 below.

G1 (A): passed amount is equal to or greater than 90%
NG (C): passed amount is less than 90%

TABLE 1

| Powder coating material No. | Form | Powder particles | | | | | | Evaluation | |
|---|---|---|---|---|---|---|---|---|---|
| | | D50v (μm) | GSDv | Average circularity | Content of metal ion (% by weight) | surface adjusting agent | Existence of sea-island structure | Diameter of island portion (μm) | Smoothness | Storage property |
| Example 1 | (1) | Core/shell | 5.8 | 1.25 | 0.97 | 0.01 | Silicone oil containing long chain alkyl group | Yes | 0.1 | G1(A) | G1(A) |
| Example 2 | (2) | Core/shell | 5.6 | 1.21 | 0.98 | 0.005 | silicone oil containing methacrylic group | Yes | 0.005 | G2(B) | G1(A) |
| Example 3 | (3) | Core/shell | 5.5 | 1.23 | 0.96 | 0.02 | silicone oil containing methacrylic group | Yes | 0.02 | G2(B) | G1(A) |
| Example 4 | (4) | Core/shell | 5.8 | 1.22 | 0.96 | 0.007 | silicone oil containing phenyl group | Yes | 0.05 | G2(B) | G1(A) |
| Example 5 | (5) | Core/shell | 5.7 | 1.24 | 0.98 | 0.01 | dimethyl silicone oil | Yes | 0.01 | G2(B) | G1(A) |
| Com. Ex. 1 | (C1) | Core/shell | 6.5 | 1.2 | 0.94 | 0.3 | Silicone resin | None | — | NG (C) | NG (C) |

As illustrated in Table 1, in the examples, it is found that the coating films which are excellent in smoothness are obtained with the sea-island structure including the island portion of the surface adjusting agent in the core, compared to the comparative examples.

In addition, it is found that the powder coating materials of the examples are excellent in the storage resistance.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A thermosetting powder coating material comprising:
    powder particles having a core that has a sea-island structure composed of an island portion containing a surface adjusting agent and a sea portion containing a thermosetting resin and a thermosetting agent, and a resin coating portion that coats a surface of the core.

2. The thermosetting powder coating material according to claim 1, wherein the surface adjusting agent is selected from the group consisting of a polysiloxane compound and wax.

3. The thermosetting powder coating material according to claim 2,
wherein the polysiloxane compound is selected from the group consisting of silicone oil and modified silicone oil.

4. The thermosetting powder coating material according to claim 2,
wherein the polysiloxane compound is non-reactive silicone oil.

5. The thermosetting powder coating material according to claim 2,
wherein the polysiloxane compound is silicone oil containing a long chain alkyl group.

6. The thermosetting powder coating material according to claim 2,
wherein the wax is hydrocarbon wax.

7. The thermosetting powder coating material according to claim 1,
wherein a difference between an SP value of the thermosetting resin and an SP value of the surface adjusting agent is equal to or greater than 3.0 at an absolute value.

8. The thermosetting powder coating material according to claim 1,
wherein a content of the surface adjusting agent in the core is from 0.01% by weight to 10.0% by weight with respect to the entirety of the powder particles.

9. The thermosetting powder coating material according to claim 1,
wherein the thermosetting resin is at least one kind selected from the group consisting of a thermosetting (meth)acrylic resin and a thermosetting polyester resin.

10. The thermosetting powder coating material according to claim 9,
wherein the thermosetting (meth)acrylic resin includes at least one kind selected from the group consisting of an epoxy group, a carboxyl group, and a hydroxyl group.

11. The thermosetting powder coating material according to claim 9,
wherein a number average molecular weight of the thermosetting (meth)acrylic resin is from 1,000 to 20,000.

12. The thermosetting powder coating material according to claim 9,
wherein a total of an acid value and a hydroxyl group value of the thermosetting polyester resin is from 10 mg KOH/g to 250 mg KOH/g, and a number average molecular weight of the thermosetting polyester resin is from 1,000 to 100,000.

13. The thermosetting powder coating material according to claim 1,
wherein the thermosetting agent includes at least one kind of functional group selected from the group consisting of an epoxy group, a carboxyl group, a hydroxyl group, and a block isocyanate group.

14. The thermosetting powder coating material according to claim 13,
wherein the thermosetting agent contains dodecanedioic acid.

15. The thermosetting powder coating material according to claim 1,
wherein a content of the thermosetting agent is from 1% by weight to 30% by weight with respect to the thermosetting resin.

16. The thermosetting powder coating material according to claim 1,
wherein a coverage of the resin coating portion is from 30% to 100%.

17. The thermosetting powder coating material according to claim 1, further comprising:
a divalent or higher valent metal ion in an amount of from 0.002% by weight to 0.2% by weight with respect to the entirety of powder particles.

18. The thermosetting powder coating material according to claim 1,
wherein the powder particles include an external additive on a surface in an amount of from 0.01% by weight to 5% by weight with respect to the powder particles.

19. The thermosetting powder coating material according to claim 1,
wherein a volume average particle diameter distribution index GSDv of the powder particles is equal to or smaller than 1.50.

20. The thermosetting powder coating material according to claim 1,
wherein a diameter of the island portion containing the surface adjusting agent is from 0.001 μm to 0.5 μm in the core of the powder particles.

* * * * *